United States Patent [19]
Bloomfield

[11] 3,976,507
[45] Aug. 24, 1976

[54] PRESSURIZED FUEL CELL POWER PLANT WITH SINGLE REACTANT GAS STREAM

[75] Inventor: David P. Bloomfield, West Hartford, Conn.

[73] Assignee: United Technologies Corporation, Hartford, Conn.

[22] Filed: Feb. 12, 1975

[21] Appl. No.: 549,602

[52] U.S. Cl. .............................. 136/86 R; 136/86 C
[51] Int. Cl.² .......................................... H01M 8/06
[58] Field of Search .............. 136/86 R, 86 A, 86 B, 136/86 C

[56] References Cited
UNITED STATES PATENTS

| | | | |
|---|---|---|---|
| 668,838 | 2/1901 | Lavison | 136/86 A |
| 1,182,759 | 5/1916 | Emanuel | 136/86 R |
| 3,112,229 | 11/1963 | Bacon et al. | 136/86 R |
| 3,311,097 | 3/1967 | Mittlesteadt | 123/119 |
| 3,404,529 | 10/1968 | Hagerstrom | 60/6 |
| 3,507,702 | 7/1970 | Sanderson | 136/86 R |
| 3,615,850 | 10/1971 | Chludzinski | 136/86 C |

*Primary Examiner*—John H. Mack
*Assistant Examiner*—H. A. Feeley
*Attorney, Agent, or Firm*—Stephen E. Revis

[57] ABSTRACT

A fuel cell power plant for producing electricity uses pressurized air and fuel in the cells. The power plant includes an autothermal reactor for processing the fuel and a compressor driven by a turbine for compressing the air used by the fuel cells. Pressurized effluent gases from the cathode side of the cell and pressurized fuel is delivered into the autothermal reactor and from the reactor passes into the anode side of the cells. Effluent gases from the anode side of the cells is delivered into the turbine thereby driving the compressor. A burner is used to increase the temperature of the gases entering the turbine. The burner is run on air and unburned fuel in the effluent gases from the anode side of the cells.

14 Claims, 4 Drawing Figures

PRESSURIZED FUEL CELL POWER PLANT WITH SINGLE REACTANT GAS STREAM

BACKGROUND OF THE INVENTION

1. Field of the Invention

This invention relates to power plants and more particularly to electricity producing power plants utilizing fuel cells as the power source.

2. Description of the Prior Art

In the fuel cell art there have been three general approaches to improving fuel cell performance. One approach is to increase the temperature at which the fuel cell operates. This approach, however, is limited by material corrosion. A second approach is to attempt to increase the amount of catalyst per square inch of electrode surface area. This approach, however, is limited by the increased expense and practical limitations in the amount of catalyst that can possibly be put on a certain area of electrode. A third approach is to increase the pressure of the reactants within the fuel cell. It is well known in the art that fuel cells perform better as reactant pressures increase. One of the major stumbling blocks to this approach is that it requires considerable energy to pressurize the reactants. It has been considered, for example, that the energy to pressurize reactants should be the electrical energy produced by the fuel cell; that electrical energy would be used to drive a compressor. The problem is that it takes about 30% of the electrical output of the cell stack to drive a compressor to produce a reasonable reactant pressure. This means that the fuel cell would have to be increased in size by about 50% to make up for the loss of usable electrical power. Since a fuel cell stack is itself the most expensive component of a fuel cell power plant, the increase in performance is offset by the increased cost due to increased cell size. Because total electrical power output of the cell stack is increased, other components of the power plant will have to be increased proportionately such as the condensing apparatus and the fuel conditioning apparatus. This further increases size and cost of the power plant. Further, other apparent disadvantages in the power plant system utilizing high pressure reactants are the cost of additional equipment to pressurize the reactants, the necessity for more expensive sealing arrangements, and the additional cost due to the necessity of utilizing stronger components to contain the higher pressures. In view of the foregoing considerations, with regard to power plants utilizing air as the oxidant, it has always been considered that no net advantage could be achieved, and most likely, there would be a net disadvantage in going to power plants utilizing higher pressure reactants in the fuel cell stack. For the foregoing reasons, up to the present time, these fuel cell power plants have always used reactants at atmospheric pressures.

RELATED APPLICATIONS

The following applications, filed on even date herewith and of common assignee, pertain to subject matter related to the present invention:

1. "Pressurized Fuel Cell Power Plant" by D. Bloomfield and R. Cohen, U.S. Ser. No. 549,600
2. "Pressurized Fuel Cell Power Plant" by D. Bloomfield, U.S. Ser. No. 549,601
3. "Pressurized Fuel Cell Power Plant With Air Bypass" by M. Landau, U.S. Ser. No. 549,598
4. "Pressurized Fuel Cell Power Plant With Steam Flow Through The Cells" by D. Bloomfield and M. Landau, U.S. Ser. No. 549,596
5. "Pressurized Fuel Cell Power Plant" by M. Menard, U.S. Ser. No. 549,597
6. "Pressurized Fuel Cell Power Plant With Steam Powered Compressor" by D. Bloomfield, U.S. Ser. No. 549,599

SUMMARY OF THE INVENTION

One object of the present invention is an economically attractive fuel cell power plant.

Another object of the present invention is a more efficient fuel cell power plant.

A further object of the present invention is a fuel cell power plant that needs no water recovery apparatus or separate water supply.

Accordingly, the present invention is an electricity generating power plant using fuel cells wherein air is supplied to the fuel cells under pressure from a compressor which is driven, at least in part, by energy from the fuel cell effluent gases. Compressed air enters the cathode side of the cell and from there passes into an autothermal reactor along with unprocessed fuel. The effluent gases from the autothermal reactor are delivered into the anode side of the cell, are increased in temperature by the heat generated by burning the gases in a burner, and are delivered into the compressor apparatus in the heat state for powering the compressor apparatus.

Water recovery apparatus is unnecessary because the steam needed by the autothermal reactor is present in the cathode effluent gases. Also, since the electrical energy output from the cell stack is not used to pressurize the air, there is no need to increase the size of the fuel cell stack in order to maintain the power plant capacity. As a matter of fact, full advantage can be taken of the performance improvement in the fuel cell stack such that the stack may produce even more electrical energy without an increase in its size.

A further advantage of the present invention is that the fuel conditioning apparatus, which is mainly the autothermal reactor, does not require a separate burner to supply heat. For this reason the energy in the anode effluent gases and the unburned hydrogen in the anode effluent gases may be entirely used to drive the compressor apparatus, rather than being used to provide heat for fuel conditioning apparatus.

Because the cathode effluent gases eventually pass through the anode side of the cell, an alternate embodiment of the present invention provides that the fuel be mixed with the air entering the compressor apparatus. This is particularly advantageous when the unprocessed fuel is an unpressurized gaseous fuel since it permits the fuel to be pressurized by the compressor apparatus.

The foregoing and other objects, features and advantages of the present invention will be more fully explained and will become more apparent in the light of the following detailed description of preferred embodiments thereof as illustrated in the accompanying drawing.

DESCRIPTION OF THE PREFERRED EMBODIMENTS

Figure 1:
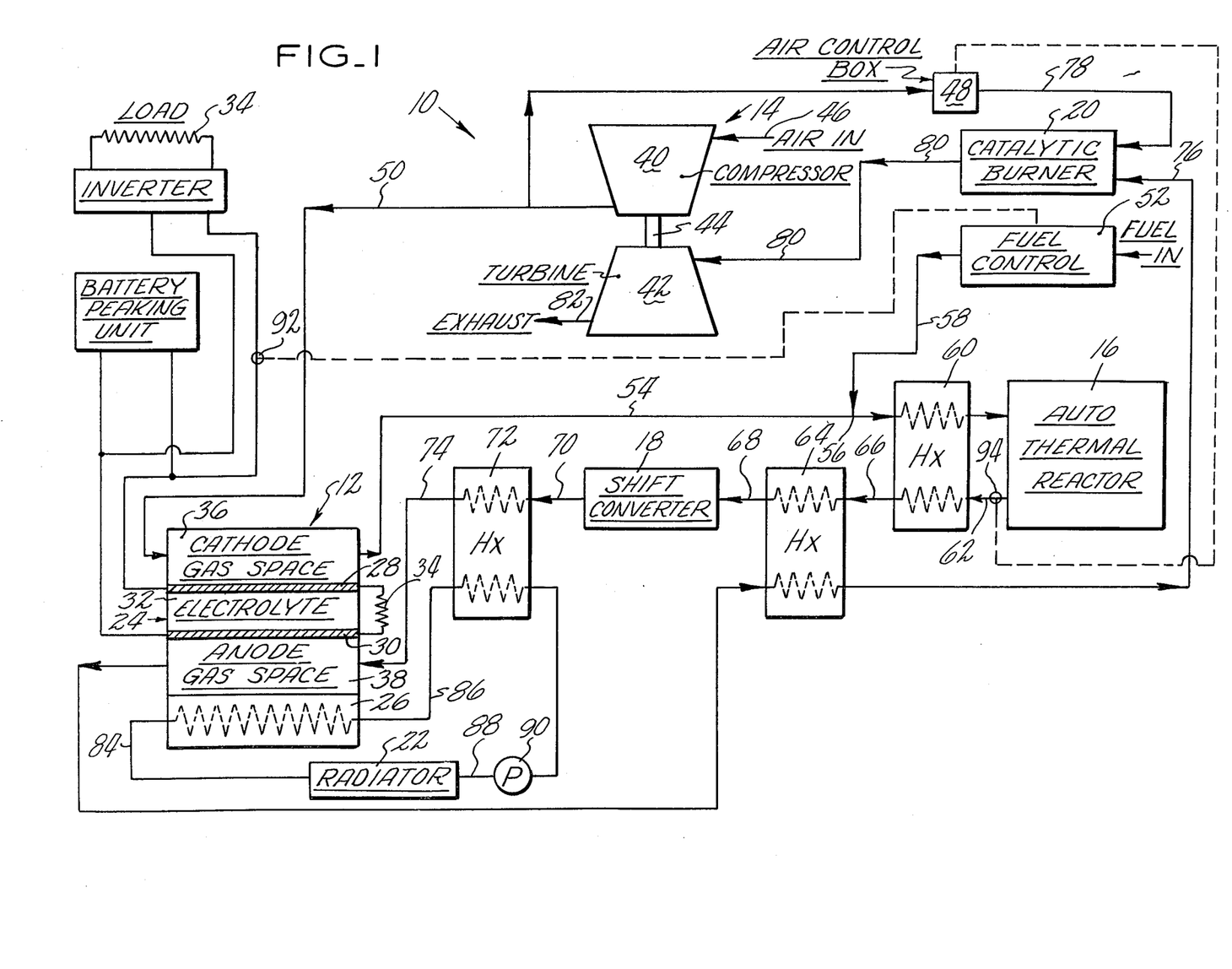
FIG. 1 is a schematic representation of a power plant according to the present invention.

Consider, as an exemplary embodiment of the present invention, the power plant depicted schematically in FIG. 1. The power plant is generally designated by the numeral 10 and includes a fuel cell stack generally designated by the numeral 12, compressor apparatus generally designated by the numeral 14, fuel conditioning apparatus comprising an autothermal reactor 16 and a shift converter 18, a catalytic burner 20, a radiator 22, and various controls, heat exchangers and pumps as will be more fully described hereinafter.

The stack 12 generally comprises a plurality of fuel cells connected electrically in series through a load, but is herein depicted as only comprising a single cell 24 for the purpose of clarity and a thermal management portion 26. The fuel cell stack 12 may comprise any conventional type of fuel cell which operates on gaseous reactants. In this embodiment the oxidant is air and the fuel is hydrogen. As herein shown each cell includes a cathode electrode 28 spaced from an anode electrode 30 and including an electrolyte retaining matrix 32 therebetween. In this preferred embodiment the electrolyte is liquid phosphoric acid but the invention is not intended to be limited thereto and other acid as well as base electrolytes or solid types of electrolytes such as metal oxide electrolytes or solid polymer electrolytes are contemplated as being useful in a power plant designed according to the present invention. The electrodes 28, 30 are connected in series though a load 34. Each cell 24 also includes a cathode gas space 36 on the nonelectrolyte side of the cathode electrode 28 and an anode gas space 38 on the nonelectrolyte side of the anode electrode 30.

Although in this embodiment the fuel conditioning apparatus is shown as including only an autothermal reactor and a shift converter, it may include additional equipment such as a selective oxidizer and an ammonia scrubber, for example. Although these components are not shown, they could readily be incorporated into the power plant and would not detract from the invention as herein described.

The compressor apparatus 14 is a turbocharger comprising a compressor 40 driven by a turbine 42 though a shaft 44, and will be described hereinafter in more detail as will other components of the power plant 10.

Still referring to FIG. 1, in operation air enters the compressor 40 via a conduit 46, and is compressed. Any pressure greater than atmospheric pressure will yield some benefit as compared to unpressurized power plants; however, about two or higher atmospheres of pressure are desirable in order that substantial benefits are realized for the total power plant. This pressurized air is divided between the catalytic burner 20 and the fuel cell stack 12 by means of an air control box 48. The portion directed to the stack 12 passes into the cathode gas space 36 via a conduit 50. In the cathode gas space 36 the oxygen in the air is electrochemically reacted within the cathode electrode 28 with the phosphoric acid electrolyte in the matrix 32 to produce electricity and water, some of the water being evaporated back into the air stream flowing through the cathode gas space 30 and leaves therewith. The same is true with regard to the anode side of the cell. Although the total amount of water leaving the stack in the anode and cathode gas space effluents will be constant, the split between streams may differ due to several factors. One factor is that the air entering the cathode gas space is dry in comparison to the gases entering the anode gas space. In view of this difference in humidity of the streams entering the stack a person having ordinary skill in the art can design the stack to control the amount of water in the effluent streams to a certain extent. For example, flowing the streams through the stack in opposite directions will increase the amount of water (i.e., steam) in the cathode gas space effluent at the expense of the anode gas space effluent. Since, as will hereinafter be more fully explained, the steam for processing the fuel is obtained from the cathode gas space effluent, it is important that the stack 12 be designed so that the cathode gas space effluent will have a sufficient amount of steam therein.

Unprocessed gaseous fuel, which in this embodiment is pressurized natural gas, enters a fuel control 52. (If the unprocessed fuel were a liquid it would be pumped up to pressure by an electric pump and atomized before being combined with the cathode gas space effluent.) The moist cathode gas stream leaves the cathode gas space via a conduit 54. Fuel from the fuel control 52 is delivered into the conduit 54 at 56 via a conduit 58. (If desired, the fuel could be delivered directly into the reactor 16.) Combined fuel and cathode gas stream effluent are thereupon heated in a regenerative heat exchanger 60 using heat from the autothermal reactor effluent gases. The hot, moist mixture of cathode gas space effluent and raw fuel enters the autothermal reactor 16 wherein a combination of partial oxidizing, steam reforming, and shift converting takes place as will hereinafter be more fully described. Hydrogen, water, and other gases leave the autothermal reactor 16 via a conduit 62 and pass through the heat exchanger 60 transferring heat to the gas stream entering the autothermal reactor 16. The gases leave the heat exchanger 60 and are delivered into another heat exchanger 64 via a conduit 66 where heat is transferred to the anode gas space effluent gases. The partially processed gas stream then enters the shift converter 18 via a conduit 68 for additional processing. In the shift converter water reacts with carbon monoxide in the gas stream in the presence of a catalyst to produce additional hydrogen plus carbon dioxide and heat according to the following equation:

$$CO + H_2O \rightarrow H_2 + CO_2 + \text{heat} \qquad (1)$$

Processed fuel leaves the shift converter 18 via a conduit 70 and is delivered into another heat exchanger 72 where additional heat is removed. The gases are then delivered into the anode gas space 38 via a conduit 74 wherein the hydrogen in the gas stream reacts with the electrolyte 32. The effluent gases from the anode gas space 38 are delivered into the catalytic burner 20 via a conduit 76 along with air from the compressor 40 via a conduit 78. The air and unburned hydrogen in the anode gas space effluent gases burn in the presence of a catalyst such as platinum. The effluent gases from the burner 20 are delivered into the turbine 42 via a conduit 80 and drive the compressor 40. The gases are then exhausted from the turbine 42 via a conduit 82. The catalytic burner 20 is needed to boost the temperature of the gases entering the turbine 42 in order to drive the compressor 40 at a speed sufficient to maintain a desired output pressure.

In this embodiment cooling of the stack 12 is accomplished by a separate coolant loop. A coolant such as silicone oil or water enters the thermal exchange portion 26 of the stack 12 and into heat exchange relationship with the stack 12 via a conduit 84. The coolant fluid picks up heat from the stack 12 and leaves via a conduit 86. In this embodiment the coolant fluid also removes heat from the gases about to enter the anode gas space 38 by passing through the regenerative heat exchanger 72. The hot fluid is then delivered into a radiator 22 via a conduit 88 where the heat is rejected, for example, to atmosphere. A pump 90 is shown for circulating the coolant fluid.

Figure 2:
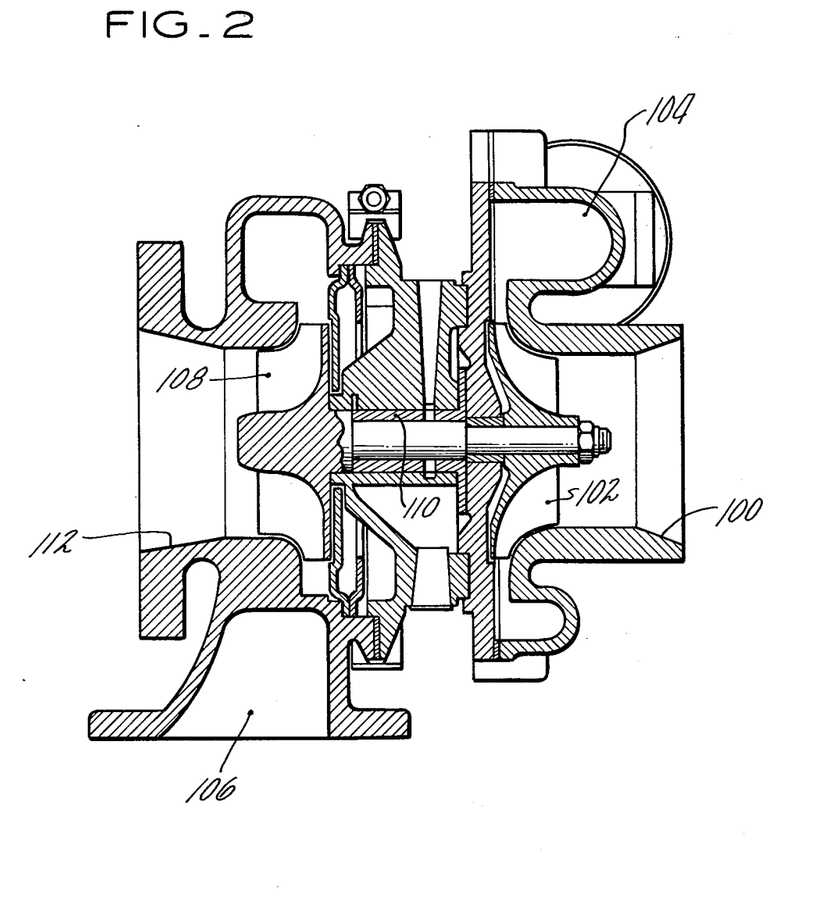
FIG. 2 is a cross-sectional view of a turbocharger which may be used in power plants of the present invention.

As an example of compressor apparatus suitable for use in a power plant designed according to the present invention, consider the turbocharger shown in FIG. 2. Ambient air enters a compressor duct 100, and impinges upon a single stage centrifugal impeller 102 which imparts a velocity head to the air. The high velocity air flows into a diffuser 104 where the velocity head is changed to a pressure head. In the embodiment of FIG. 1 the compressed air would leave the diffuser 104 via the conduit 50 and would be introduced into the cathode gas space 36. On the other side, hot gases enter a turbine inlet 106 (such as from conduit 80 in FIG. 1) and flow through a centrifugal turbine rotor 108 which converts the thermal energy of the gas stream to shaft horsepower to drive a shaft 110 connected to the compressor impeller 102. The gases are exhausted via a turbine outlet duct 112.

The turbocharger pictured in FIG. 2 is only illustrative of the type of device preferred for use in the power plants of the present invention. Any commercially available turbocharger of a size sufficient to provide the required flow rate and pressure needed by the fuel cell stack chosen for use in the power plant may be used. For example, for a 1200 kilowatt power plant wherein it is desired that the reactant gases to the fuel cell stack are to be about 3.5 atmospheres pressure, a Brown Boveri model RR150 turbocharger would be suitable. This particular model has the capability of providing a mass flow rate of up to 3.0 lb/sec at 50 psia. Although the term "turbocharger" is usually associated with a centrifugal compressor, as used herein it is intended to encompass an axial flow compressor as well. Centrifugal compressors are preferred because they have the advantage of high efficient and high single-stage compression ratios not usually available with axial flow compressors. Also, although the turbocharger of FIG. 2 shows a centrifugal turbine, it is also contemplated that turbochargers using axial flow turbines may be used in power plants of the present invention.

Although what is pictured in FIG. 2 is representative of what is typically referred to in the art as a "turbocharger" the present invention is not intended to be limited thereto but may be any apparatus which uses the energy of a hot pressurized gaseous medium (typically exhaust gases) to compress another gas. For example, any heat engine capable of driving a compressor and which itself may be powered by a hot pressurized gas stream may be used. Also, a Comprex (registered trademark of Brown Boveri & Company, Ltd., Bade, Switzerland) supercharger which compresses air by direct transmission of energy from an expanding gas utilizing compression and expansion waves, or other device which works on similar principles, may be used. The Comprex supercharging concept is well known in the art and is more fully described in an ASME paper No. 58-GTP-16 titled "The Comprex . . . A New Concept of Diesel Supercharging" by Max Berchtold and F. J. Gardiner published in March 1958.

The autothermal reactor 16 is an important part of the present invention. Basically, three fuel conditioning reactions take place simultaneously within the reactor 16. There is a steam reforming reaction according to the following equation $$CH_4 + 2H_2O \rightarrow 4H_2 + CO_2 - \text{heat} \qquad (2)$$

There is partial oxidizing according to the following equation $$CH_4 + \tfrac{1}{2} O_2 \rightarrow CO + 2H_2 + \text{heat} \qquad (3)$$

and there is a shift converting according to the following equation $$CO + H_2O \rightarrow CO_2 + H_2 + \text{heat} \qquad (4)$$

Although the fuel in the equations (2) and (3) is shown as being methane, this is by way of example and is not intended to limit the scope of the present invention. The heat generated by the partial oxidizing reaction and by the shift converting reaction is used to drive the steam reforming reaction and therefore no separate burner (and thus no additional fuel) is required for fuel processing. This is an important advantage. Also, the steam producing apparatus and water recovery apparatus and the controls associated therewith are completely eliminated because the cathode gas space effluent, which already includes sufficient steam for fuel procssing, passes directly into the autothermal reactor 16 along the raw fuel which has been added thereto. This greatly simplifies the power plant system and the expense associated with that equipment.

The autothermal reactor is well known in the art and has been built commercially. The autothermal reactor and how it operates to convert a hydrocarbon fuel and moist air into hydrogen gas is described in an article dated May 1962 in "The Journal of World Nitrogen" titled *Topsoe-SBA Autothermal Process for Production of Synthesis Gas and Hydrogen.*

In, for example, a 50 psia system according to the present invention wherein the electrolyte is phosphoric acid and the raw fuel is natural gas, the gas stream exiting from the reactor will contain about 55% nitrogen, 17% water, 20% hydrogen, 3.5% CO, 4.5% $CO_2$ and negligible amounts of methane. These amounts will vary somewhat depending upon the constituents entering the reactor and the temperature of the gases entering the reactor. Note the high nitrogen content of the gases leaving the reactor 16 due to the fact that large quantities of air enter the reactor. These gases, after passing through the heat exchangers 60 and 64 are further processed in the shift converter 18 to further increase the amount of hydrogen and reduce the amount of carbon monoxide. Due to the high pressure of the gases and due to the high oxygen to carbon ratio in the gas stream entering the shift converter, which results from the large number of oxygen molecules in the cathode gas stream effluent, the shift converter is extremely efficient in the sense that is is able to remove almost all the carbon monoxide in the gas stream. This is an advantage resulting from the present invention. A typical composition of the gases leaving the shift converter is about 55% nitrogen, 14% water, 23.6% hydrogen, 0.3% CO, 7.7% $CO_2$, and negligible amounts of methane. These are the gases which enter the anode gas space 38. Because of the extremely high nitrogen content, the hydrogen partial pressure is particularly low at the inlet to the anode gas space. By the time the gases leave the anode gas space there is only about 3% hydrogen, which is about one third of the percent of hydrogen usually found in the anode gas space effluent of prior art cells. The well known Nernst equation states that there will be a decrease in anode performance (i.e., a decrease in cell voltage) when the partial pressure of hydrogen is decreased. The Nernst equation is set forth below:

$$\Delta V_{anode} = C(mv) \ln \left[ \frac{P_{H2}}{P_{H2(ref)}} \right] \quad (5)$$

where $C$ is a constant, $\Delta V_{anode}$ is the change in cell voltage, $P_{H2}$ is the partial pressure of hydrogen in the anode gas space and $P_{H2(ref)}$ is a reference partial pressure. If gases of the foregoing composition were used in a stack operating at atmospheric pressure the performance of the anode would be so low as to be impractical. In the present invention, the fact that the total pressure of the gases is high compensates somewhat for the low percentage of hydrogen in the gas stream making a power plant designed according to the present invention attractive for many applications even at gas pressures of 50 psia. Of course, if the gas pressures reach, for example, 10 atmospheres there will be a significant improvement in anode performance over the prior art despite the low percentage of hydrogen in the gas stream. In this regard, notice that in this invention the pressure of the steam supplied to the reactor 16 is the same as the pressure of the air supplied by the compressor 40. In power plants wherein steam is supplied from a separate source, such as a boiler, into a steam reforming reactor, the pressure of the steam is usually limited by the temperature available to convert the water into steam in the boiler. This may limit the pressure of the processed fuel delivered into the anode gas space. There is no such limitation in the present invention.

Referring once again to FIG. 1, a control system is described to permit operation of the power plant in an efficient manner at various power levels. The fuel control 52 senses current output of the power section at 92 and is responsive thereto. When the power level of the power plant is turned down the fuel control automatically senses that the current has decreased and reduces the amount of fuel delivered into the cathode effluent gas stream. The fuel may be either reduced to a level which will sustain the air pressure delivered by the compressor 40, or it may be reduced to a level wherein the air pressure will be reduced.

It is also desired that the temperature of the gases leaving the autothermal reformer be maintained relatively constant at all power levels. The air control box 48 which regulates the split of air from the compressor as between the catalytic burner and the cathode gas space, is responsive to the temperature at 94 of the gases leaving the autothermal reformer. That temperature increases and decreases depending upon the amount of fuel and air delivered into the autothermal reformer. If the power level is reduced the fuel supply to the autothermal reformer is reduced and the temperature of the gases leaving the autothermal reformer will increase due to an air-rich mixture. This will cause the air control box 48 to decrease the amount of air flowing through the cathode gas space 36 and increase the air flow to the catalytic burner 20. Thus less air will flow into the autothermal reformer along with the lesser amount of fuel thereby reducing the temperataure of the gases leaving the autothermal reformer. In order to reduce the power level while at the same time reducing the pressure of the reactants in the system the fuel flow is reduced to the point wherein the amount of unburned hydrogen in the anode gas stream effluent is less than at full power operation. That means that the amount of fuel delivered to the catalytic burner will be less than at full power operation thereby resulting in a lower temperature of the effluent from the catalytic burner into the turbine and a lower turbine speed. A lower turbine speed means a lower pressure output from the compressor.

Because there is a lag from the time the fuel flow is increased (for increasing power level) to when the power plant reaches the desired higher power level, a battery peaking unit 96 is employed such as shown and described in commonly owned U.S. Pat. No. 3,823,358 to Paul Rey. This unit is responsive to the current produced by the stack and comprises a battery which has energy stored therein and which operates during the lag period to quickly increase the power output of the power plant until the stack itself is brought up to the required power level by the increased fuel flow. This is not considered a part of the present invention. An inverter 98 is shown for converting direct current to alternating current.

Figure 3:
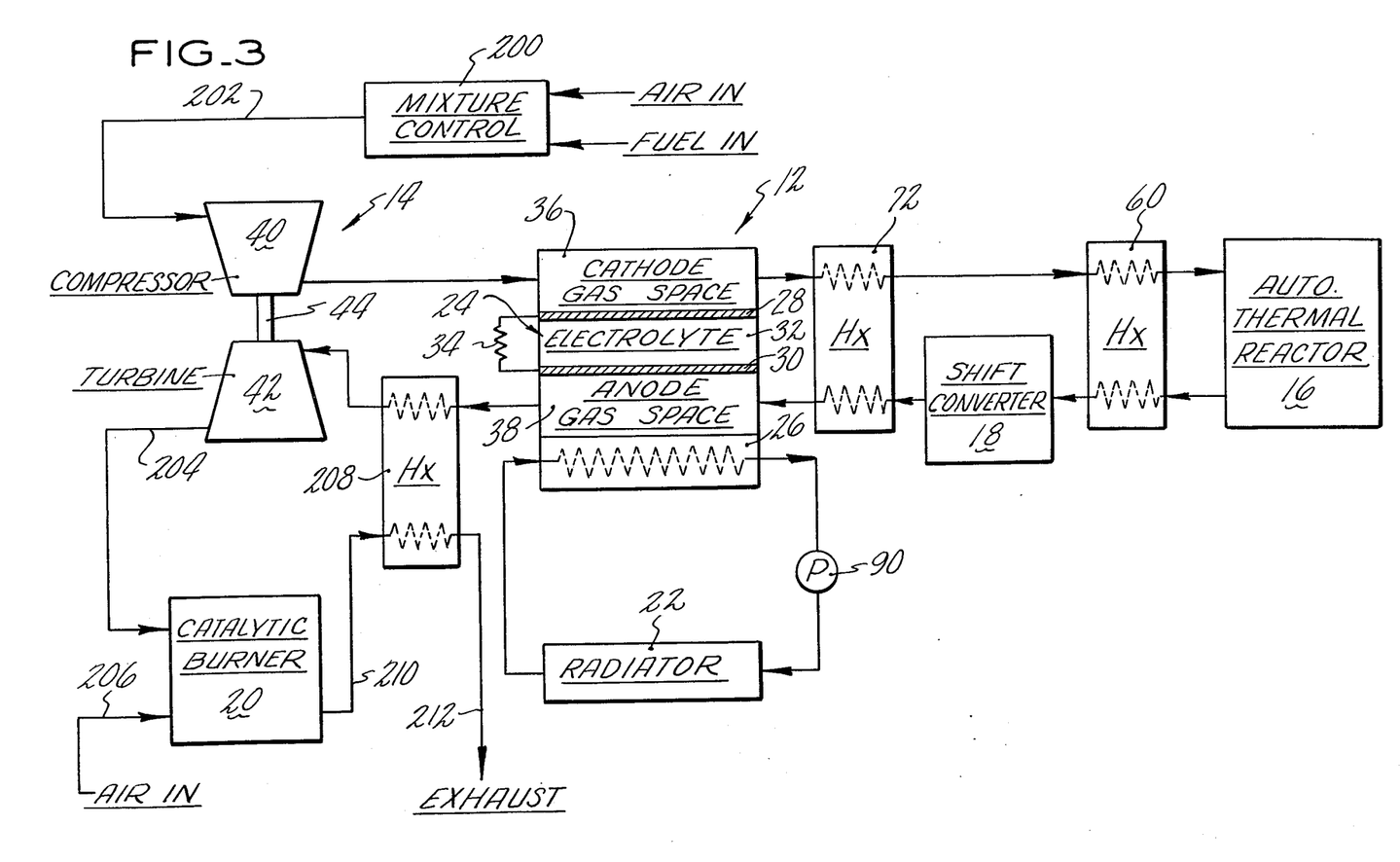
FIG. 3 is a schematic representation of a power plant according to an alternate embodiment of the present invention.

Referring now to FIG. 3, an alternate embodiment of the present invention is shown schematically. Components which are similar to those of the power plant depicted in FIG. 1 are designated by the same numerals. Only differences between this embodiment and the embodiment of FIG. 1 are hereinafter set forth.

The major difference between this embodiment and the embodiment of FIG. 1 is that the unprocessed or raw fuel is mixed with air in a mixture control 200 and both are delivered into the compressor 40 via a conduit 202. The turbocharger increases the pressure of the fuel and air. This is particularly useful if the raw fuel available for use in the power plant is insufficiently pressurized gaseous fuel since it is undesirable to use electrical energy produced by the stack to pump a gaseous fuel up to pressure. The pressurized fuel mixed with air passes through the cathode gas space, but very little of this fuel (which would usually be methane) is reacted at the cathode so that virtually all the fuel simply enters the autothermal reactor under pressure.

Another difference between this embodiment and the embodiment of FIG. 1 is that the catalytic burner is positioned downstream of the turbine 42 rather than upstream of the turbine 42. The turbine exhaust is delivered into the catalytic burner 20 via a conduit 204 along with unpressurized air via a conduit 206 and is burned, thereby increasing the temperature of the gases. The effluent from the burner 20 is delivered into a heat exchanger 208 via a conduit 210 and its heat is transferred to the anode gas space effluent gases before they enter the turbine 42. The burner effluent gases are then thrown away via a conduit 212. By positioning the catalytic burner downstream of the turbine, the exhaust gases from the burner do not pass through the turbine 42 and need not be pressurized. If the catalytic burner were disposed upstream of the turbine 42 as in the embodiment of FIG. 1 it would have to be supplied with pressurized air. Since the air leaving the compressor 40 in the embodiment of FIG. 3 also includes fuel, some of this fuel would necessarily be fed into the catalytic burner 20. Since the effluent gases from the anode gas space have sufficient unburned hydrogen to drive the catalytic burner, the extra fuel would simply be wasted.

A further difference between this embodiment and the embodiment of FIG. 1 is that the heat exchanger 72 is now disposed so as to transfer heat from the effluent gases leaving the shift converter 18 to the effluent gases leaving the cathode gas space 36. This is a relatively unimportant distinction between the two embodiments. The change has been made simply to illustrate the fact that the precise position of the heat exchangers in power plants of the present invention are not critical. The purpose of the heat exchanger 72 is to cool down the gases entering the anode gas space. This is accomplished in the embodiments of both FIGS. 1 and 3. Power plants designed according to the present invention may have more or fewer heat exchangers than are shown in these drawings.

Figure 4:
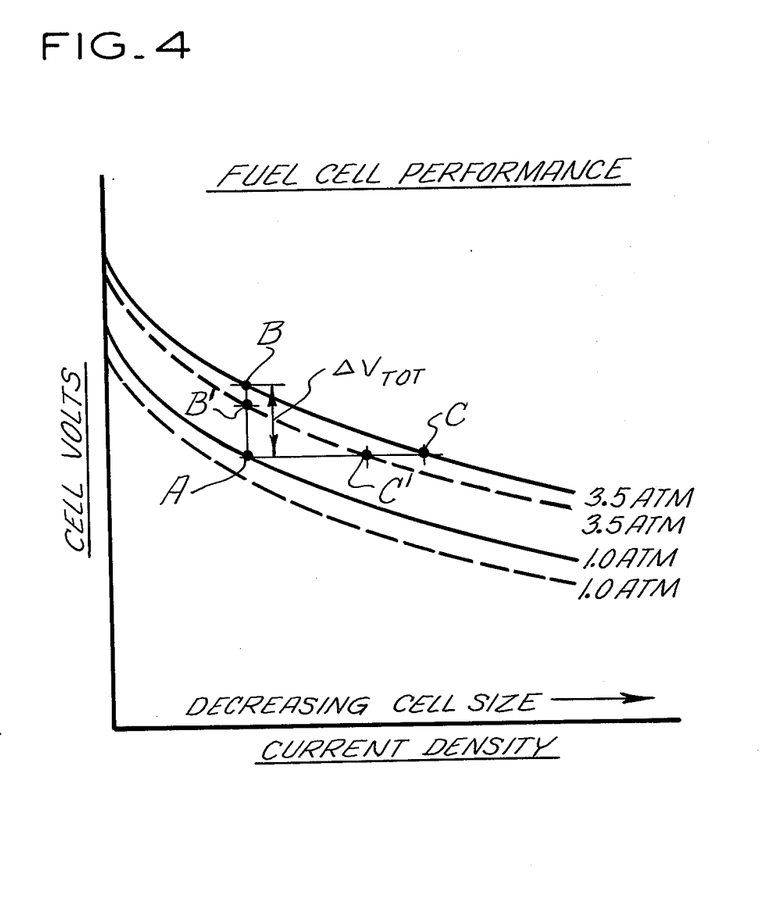
FIG. 4 is a graph illustrating the performance of fuel cells used in power plants of the present invention.

In order to more fully appreciate and understand the advantages of operating a fuel cell power plant using pressurized reactants, consider the graph of FIG. 4 which may be used to compare the performance of a fuel cell using reactants at atmospheric pressure to the performance of the same fuel cell using, for example, reactants at about 3.5 atmospheres of total pressure. There are several variables which must be taken into consideration when making comparisons between cells. Reactant utilization is the weight flow rate of reactants at either the anode or the cathode which is consumed in the cell by the electrochemical reaction divided by the weight flow rate of hydrogen or oxygen, respectively, into the cell. In a fuel cell operating an oxygen and hydrogen there is thus oxygen utilization ($U_{O2}$) at the cathode and hydrogen utilization ($U_{H2}$) at the anode. Raising reactant utilization automatically lowers the partial pressure of the reactants seen by the anode and the cathode since more reactants are taken out of the gas stream per pound of mass flow through the cell; thus, the average amount of reactant in the gas stream over the surface of the electrode is less from the inlet to the outlet. The curve labeled 1.0 atmosphere in FIG. 4 represents cell performance at a particular hydrogen utilization and oxygen utilization. The solid curve labeled 3.5 atmospheres represents cell performance at the same reactant utilization ratio. Also, the cells represented by each of these curves is assumed to be operating at the same temperature. The well known Tafel equation states that there will be an increase in cathode performance (i.e., an increase in voltage) when the partial pressure of oxygen increases. This equation is set forth below.

$$\Delta V_{cathode} = K(\text{mv}) \log \left[ \frac{P_{O2}}{P_{O2(ref)}} \right] \quad (6)$$

where $K$ is a constant. The Nernst equation states that there will be an increase in anode performance (i.e., an increase in cell voltage) when the partial pressure of hydrogen is increased. The Nernst equation was set forth earlier as equation (5) but is again set forth below:

$$\Delta V_{anode} = C(\text{mv}) \ln \left[ \frac{P_{H2}}{P_{H2(ref)}} \right] \quad (7)$$

It is apparent that for constant temperature and for constant utilization, an increase in the total pressure of the reactants results in an increase in the partial pressure of both reactants leading to an improvement in both cathode and anode performance. The total improvement in fuel cell performance may be simply stated as follows:

$$\Delta V_{total} = \Delta V_{cathode} + \Delta V_{anode} \quad (8)$$

The left hand side of equation (8) is illustrated by the graph of FIG. 4 as the difference in voltage between points A and B at constant current density. Further, from the graph of FIG. 4, it can be seen that by operating at reactant pressures of 3.5 atmospheres the cell size may be decreased without decreasing the cell voltage output such as by operating at point C.

The dotted curves on the graph of FIG. 4 are also representative of cell performance at 1.0 and 3.5 atmospheres of reactant pressure, respectively, as labeled. These curves represent the performance of cells similar in all respects to cells represented by the solid curves except that the cells have been designed for higher reactant utilization. Despite the fact that in the present invention at 3.5 atmospheres the hydrogen partial pressure entering the anode gas space may be lower than the hydrogen partial pressure entering the anode gas space of an unpressurized prior art power plant, the improvement in cell performance due to the increase in oxygen partial pressure allows the cell to run at higher reactant utilization and still show improvement over the prior art, such as an increase in cell voltage by operating at point B' or an increase in current density (i.e., a decrease in cell size) for the same cell voltage by operating at point C'. On the other hand, notice that for a cell using reactants at atmospheric pressure an increase in utilization means either increasing the size of the cell to maintain the same cell voltage or taking a voltage loss in order to maintain the same cell size. The ability to operate at higher hydrogen utilization means that less processed fuel must pass through the anode gas space in order to drive the cell. Of course, by operating at even higher gas pressures, such as at 10 atmospheres pressure, the hydrogen partial pressure will be higher than in unpressurized prior art power plants despite the presence of large amounts of nitrogen in the processed gas stream, and fuel cell performance will be improved even more.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A power plant for generating electricity comprising:

a fuel cell stack including a plurality of fuel cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode;

compressor means including a compressor operably connected to turbine means;

means for delivering air at a pressure of at least two atmospheres from said compressor into said cathode gas space;

fuel conditioning apparatus including an autothermal reactor;

means for delivering effluent gases from said cathode gas space and pressurized hydrogen containing fuel into said autothermal reactor;

means for delivering pressurized hydrogen from said fuel conditioning apparatus into said anode gas space;

means for delivering anode gas space effluent gases into said turbine means for powering said turbine means and driving said compressor; and means disposed downstream of said anode gas space for increasing the temperature of the anode gas space effluent gases before they are delivered into said turbine means, including a burner and means for delivering anode gas space effluent gases into said burner to provide fuel therefor.

2. The power plant according to claim 1 wherein said hydrogen containing fuel is gaseous and said means for delivering pressurized hydrogen containing fuel into said autothermal reactor includes means for first delivering said hydrogen containing fuel into said compressor for compressing said fuel to a pressure of at least two atmospheres.

3. The power plant according to claim 2 wherein said means for delivering pressurized fuel into said autothermal reactor includes means for delivering said pressurized fuel from said compressor into said cathode gas space along with said compressed air.

4. The power plant according to claim 1 including heat exchanger means in heat exchange relationship with the gases entering and leaving said autothermal reactor for transferring heat from said autothermal reactor effluent gases to the gases entering said autothermal reactor.

5. The power plant according to claim 1 wherein said electrolyte is phosphoric acid.

6. The power plant according to claim 1 wherein said burner is disposed upstream of said turbine means, and said means for delivering anode gas space effluent gases into said turbine means comprises means for delivering the effluent gases from said burner into said turbine means.

7. The power plant according to claim 6 including means for delivering compressed air from said compressor into said burner.

8. The power plant according to claim 1 wherein said burner is disposed downstream of said turbine means, and said means for delivering anode gas space effluent gases into said burner includes means for delivering effluent gases from said turbine means into said burner, said burner being in heat transfer relationship with said anode gas space effluent gases upstream of said turbine means.

9. In the process of generating electricity in a power plant comprising a compressor operably connected to turbine means, autothermal reactor means, and a fuel cell stack including a plurality of full cells connected electrically in series through a load, each cell comprising a cathode electrode, an anode electrode, an electrolyte disposed therebetween, a cathode gas space on the nonelectrolyte side of said cathode electrode and an anode gas space on the nonelectrolyte side of said anode electrode, the steps of:

compressing air to greater than two atomspheres pressure in said compressor;

delivering said compressed air at greater than two atmospheres pressure from said compressor into said cathode gas space;

delivering cathode gas space effluent into said autothermal reactor;

delivering pressurized hydrogen containing fuel into said autothermal reactor;

delivering the effluent gases from said autothermal reactor into said gas space;

delivering the effluent gases from said anode gas space into said turbine means for powering said turbine means and driving said compressor;

increasing the temperature of said anode gas space effluent gases prior to delivering them into said turbine means comprising burning the anode effluent gases in a burner.

10. The process according to claim 9 wherein said fuel is gaseous and said step of delivering pressurized fuel into said autothermal reactor includes the step of first delivering said fuel into said compressor for pressurizing said fuel.

11. The process according to claim 10 wherein the step of delivering pressurized fuel into said autothermal reactor includes the step of delivering said pressurized fuel from said compressor into said cathode gas space along with said compressed air and from said cathode gas space into said autothermal reactor.

12. The process according to claim 9 wherein the step of burning anode effluent gases in a burner includes burning said anode effluent gases with air before delivering said anode effluent gases into said turbine means.

13. The process according to claim 12 wherein said step of burning said anode gas space effluent gases with air includes the step of burning said gases with air delivered from said compressor.

14. The process according to claim 9 wherein the step of burning anode effluent gases in a burner is done after said anode effluent gases have been exhausted from said turbine means, including transferring the heat resulting from said step of burning to the anode effluent gases before said anode effluent gases are delivered into said turbine means.

* * * * *

UNITED STATES PATENT OFFICE
CERTIFICATE OF CORRECTION

PATENT NO. : 3,976,507
DATED : August 24, 1976
INVENTOR(S) : David P. Bloomfield It is certified that error appears in the above-identified patent and that said Letters Patent are hereby corrected as shown below:

Column 1, line 53 - "higher" should read --high--

Column 3, line 39 - "though" should read --through--
line 53 - "though" should read --through--

Column 6, line 41 - "procssing" should read --processing--

Column 9, line 42 - "an" should read --on--

Claim 9, col. 12, line 9 - "full" should read --fuel--
line 26 - after the word "said" insert --anode--

Signed and Sealed this

Twenty-sixth Day of October 1976

[SEAL]

Attest:

RUTH C. MASON
Attesting Officer

C. MARSHALL DANN
Commissioner of Patents and Trademarks